W. DUNN.
GEARLESS VARIABLE SPEED TRANSMISSION.
APPLICATION FILED JULY 1, 1918.
1,343,254.
Patented June 15, 1920.
6 SHEETS—SHEET 4.
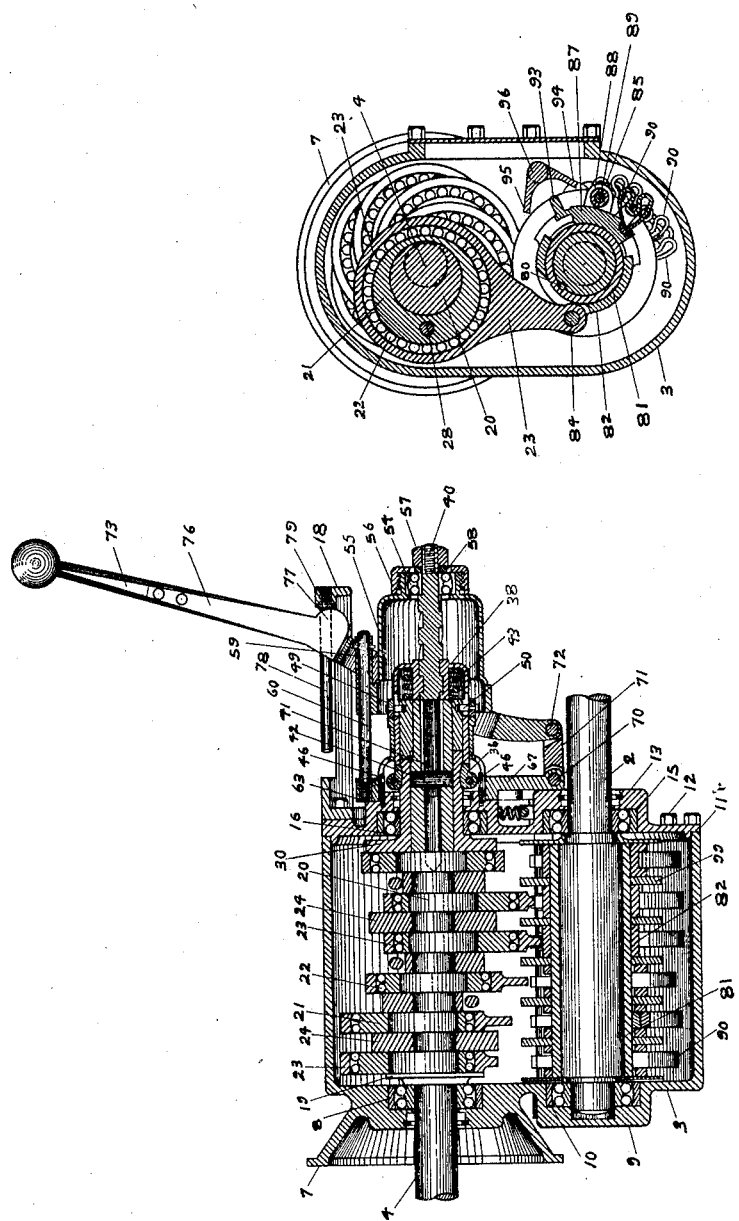
WITNESSES:
C. Sidney Smith
A. M. Dunlap
INVENTOR.
William Dunn

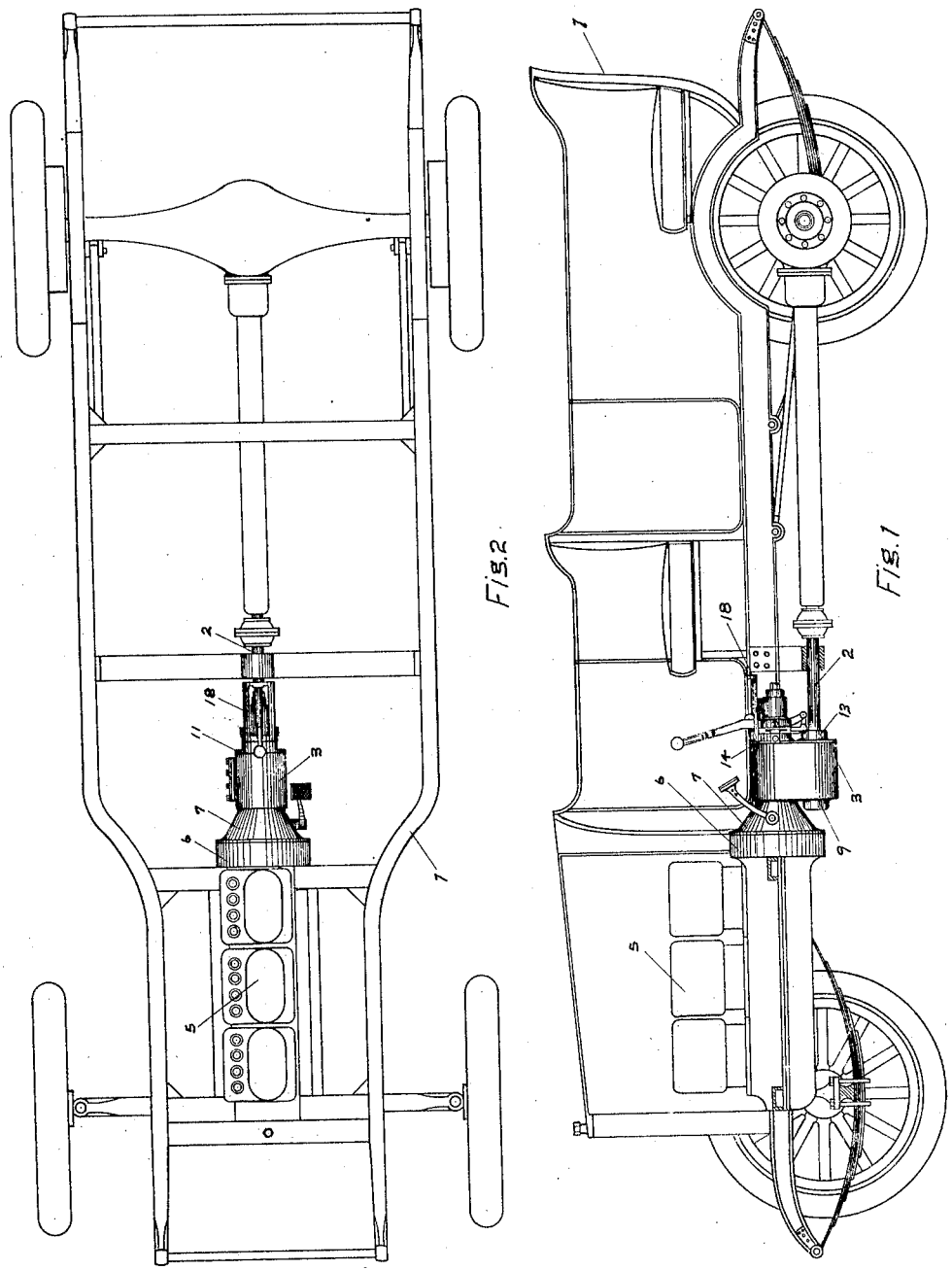

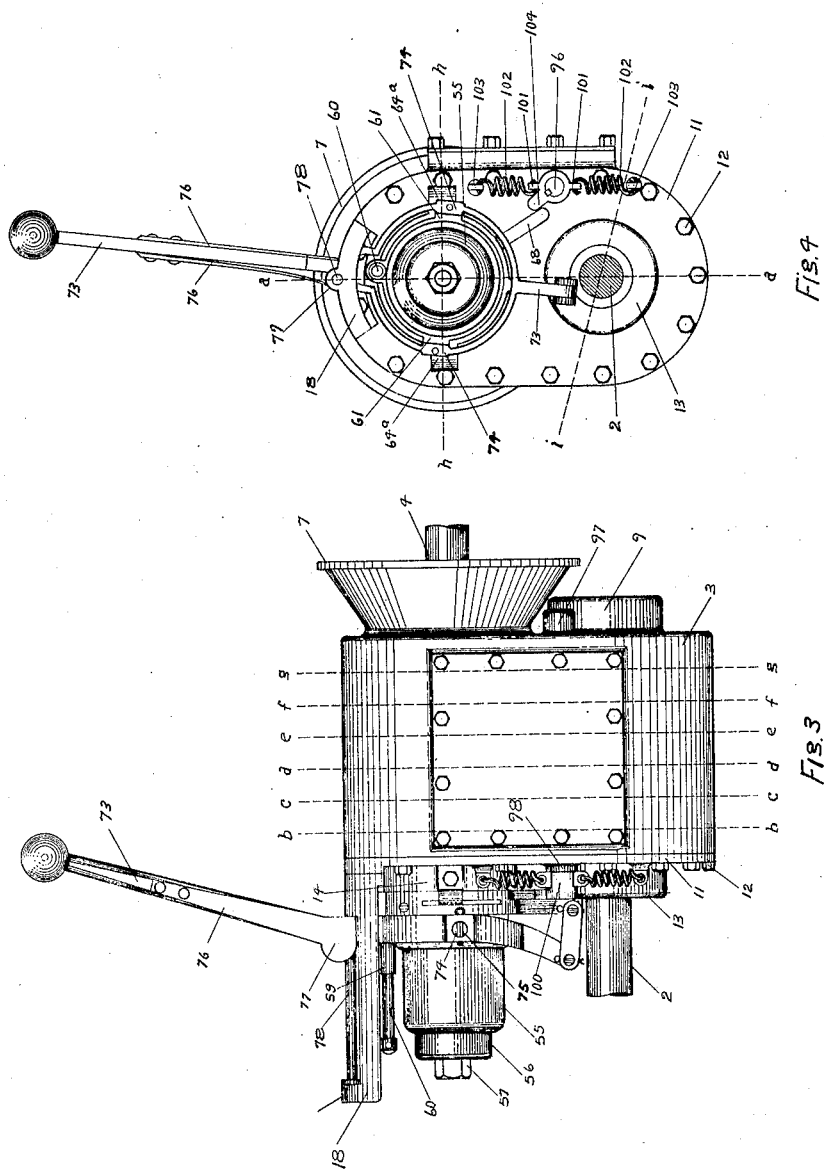

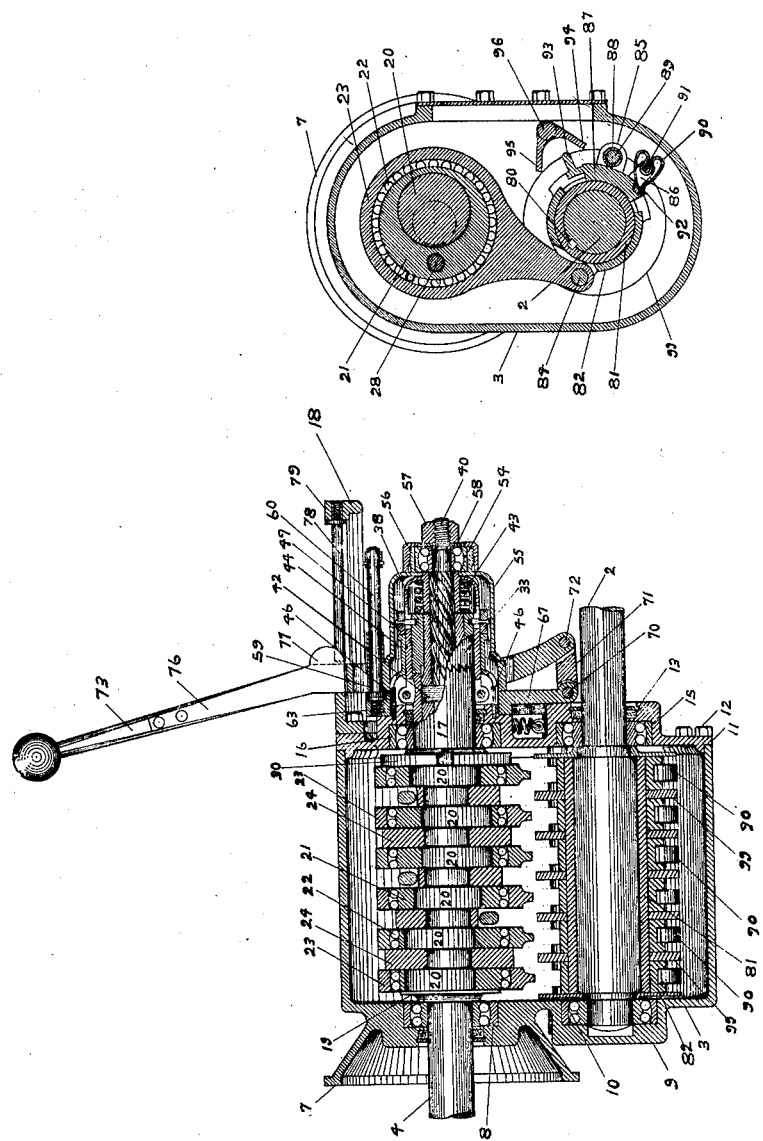

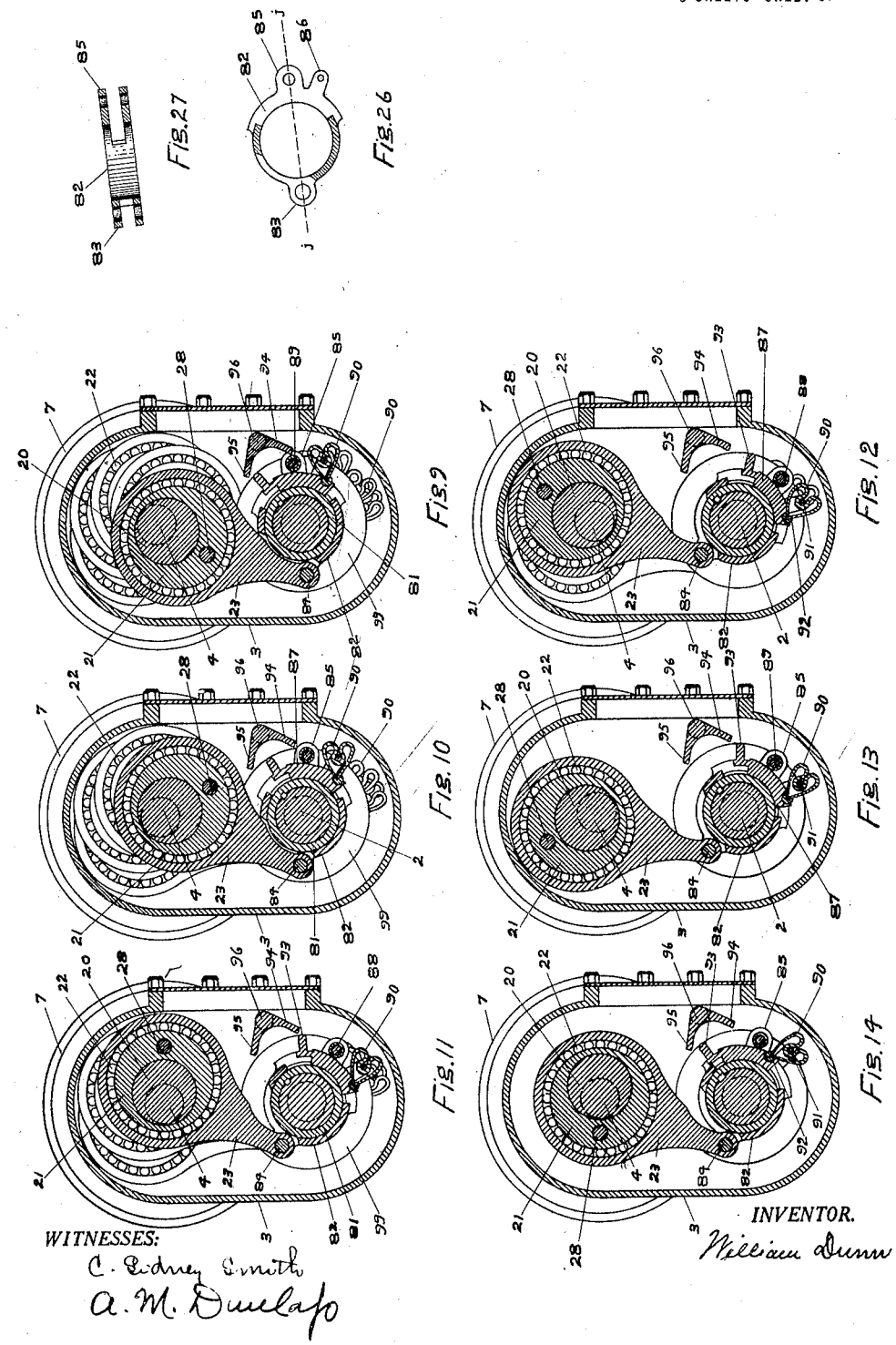

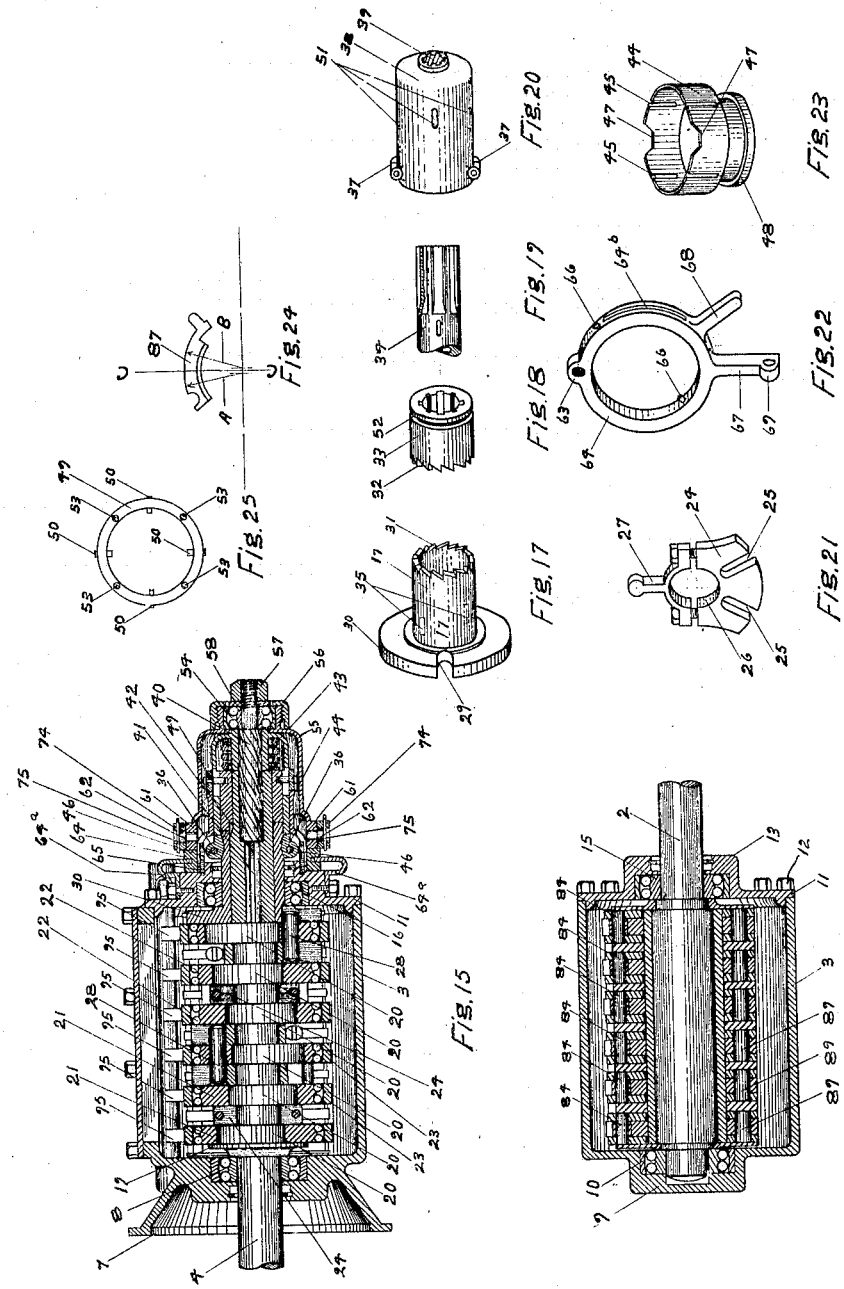

UNITED STATES PATENT OFFICE.

WILLIAM DUNN, OF ELK, WYOMING.

GEARLESS VARIABLE-SPEED TRANSMISSION.

1,343,254.      Specification of Letters Patent.      Patented June 15, 1920.

Application filed July 1, 1918. Serial No. 242,746.

*To all whom it may concern:*

Be it known that I, WILLIAM DUNN, a citizen of the United States, residing at Elk, in the county of Lincoln and State of Wyoming, have invented certain new and useful Improvements in Gearless Variable-Speed Transmission, of which the following is a specification.

The principal object of the invention is to provide a positive, gearless and noiseless transmission for automobiles and other apparatus operated by gas, steam or electric power. The invention contemplates the provision of means offering a wide range of speeds, any one of which may be readily selected without the noise and friction incident to the operation of changing gears in the ordinary transmission mechanism.

Another object of the invention is to automatically lock the car against movement in a reverse direction when the machine is stopped, thereby eliminating the necessity of setting an emergency brake to provide against such a contingency.

Another object of the invention is to eliminate the acute angle at which the engine shaft is connected to the main drive shaft by a universal joint; and in so doing, reducing friction to the minimum. My invention contemplates means for so connecting the engine and main drive shafts that the amount of friction will remain the same for all speeds.

Other important and incidental objects will be brought out in the following specification and particularly set forth in the subjoined claims.

The preferred form of embodiment of my invention is illustrated in the accompanying drawings, of which Figure 1 is a side elevation of an automobile equipped with my new form of transmission mechanism. Fig. 2 is a plan view of the chassis of an automobile containing my new form of transmission. Fig. 3 is a side elevation of the transmission mechanism itself. Fig. 4 is an end view of the latter. Fig. 5 is a sectional view taken on the line $a$—$a$ of Fig. 4, showing the transmission in a neutral position. Fig. 6 is a section taken on the line $b$—$b$ of Fig. 3, showing the transmission in a neutral position. Fig 7 is also a section on the line $a$—$a$ of Fig. 4, showing the transmission in the full speed position. Fig. 8 is a section taken on the line $b$—$b$ of Fig. 3, showing the transmission in the full speed position. Fig. 9 is a section taken on the line $c$—$c$ of Fig. 3, showing the transmission in the full speed position. Fig. 10 is a section taken on the line $d$—$d$ of Fig. 3, showing the transmission in the full speed position. Fig. 11 is a section taken on the line $e$—$e$ of Fig. 3, showing the transmission in the full speed position. Fig. 12 is a section taken on the line $f$—$f$ of Fig. 3, showing the transmission in the full speed position. Fig. 13 is a section taken on the line $g$—$g$ of Fig. 3, showing the transmission in the full speed position. Fig. 14 is a section taken on the line $b$—$b$ of Fig. 3, showing the transmission in a reverse position. Fig. 15 is a section taken on the line $h$—$h$ of Fig. 4, showing the transmission in a neutral position. Fig. 16 is a section taken on the line $i$—$i$ of Fig. 4. Fig. 17 is a perspective view of the sleeve surrounding the drive shaft, that is secured to the eccentric disks. Fig. 18 is a perspective view of the sleeve rotated by the drive shaft, that is adapted to be moved into engagement with the first sleeve for the purpose of turning it. Fig. 19 is a perspective view of the fluted end of the drive shaft on which the second sleeve is mounted. Fig. 20 is a perspective view of a third sleeve which surrounds the first and second sleeves, and is secured to the first for the purpose of rotating it to set the eccentric disks in a position to communicate a desired speed to the transmission shaft. Fig. 21 is a perspective view of an assembled link for the purpose of receiving the pins which connect the eccentric disks. Fig. 22 is a perspective view of the collar which operates the reverse gear. Fig. 23 is a perspective view of the sleeve cam that disengages the first sleeve from the second. Fig. 24 is a side view of the sliding shoe. Fig. 25 is an assembled plan view of the sleeve coupling collar. Fig. 26 is a vertical section of one of the collars on the transmission shaft. And Fig. 27 is a sectional view taken on the line $j$—$j$ of Fig. 26.

Throughout the specification and drawings, similar reference characters denote corresponding parts.

In a detailed description of the preferred form of embodiment of my invention, the numeral 1 designates an automobile containing my improved transmission mechanism, which may be applied as well to other apparatus. The numeral 2 designates the transmission shaft, which enters a housing 3, for variable rotation by means to be described. Entering the upper end of the housing 3, is a shaft 4 which is driven by an internal combustion engine 5 through the usual clutch mechanism (not shown) in the clutch housing 6. The housing 3, which receives the shafts 2 and 4, consists of a metallic shell preferably elliptical in vertical cross section as shown in Fig. 6. At its upper forward end, the housing 3 is provided with an outwardly flaring flange portion 7 for connection with the clutch housing 6. (See Figs. 1 and 2.)

Provided in the upper forward end of the housing 3, is a bearing 8, preferably of the ball type, which receives the shaft 4, while a boss 9 on the lower forward end of said housing, contains a similar bearing 10 for the forward end of the shaft 2.

The housing 3 is closed by a back end plate 11 which is preferably secured thereto by cap screws 12. The end plate 11 is provided with a lower boss 13 and an upper boss 14. Provided in the lower boss 13 is a bearing 15, preferably of the ball type, which receives the shaft 2, while the upper boss 14 contains a larger bearing 16 to receive a sleeve 17 on the shaft 4. Preferably bolted on the extreme upper end of the end plate 11, is an elongated guiding member 18, preferably segmental in cross section, hereinafter to be described. (See Figs. 1, 3, 4 and 7.)

Preferably turned on the shaft 4 at its forward end within the housing 3, is a collar 19 and a series of eccentrics 20, preferably six in number and spaced 60° apart. (See Figs. 5 and 7.) If four eccentrics were used, it would be necessary to set them 90° apart; or, if three eccentrics were employed, they would have to be set 120° apart. Any number of eccentrics set apart in the same ratio, may be employed.

Surrounding each eccentric 20 is an adjustable eccentric disk 21. Provided in the periphery of each disk 21 is an annular groove which forms a raceway for ball bearings 22 that are surrounded by the circular internally-grooved portion of a connecting arm 23, said bearings forming a frictionless connection between each arm and its respective eccentric disk for a purpose to be hereinafter described.

Interposed between each eccentric 20 and its adjacent one to the right, is an assembled link 24 loosely mounted on the shaft 4. (See Figs. 7 and 21.) Each link 24 comprises a metallic piece preferably in two sections, the lower one of which consists of a flat piece having a circular rim from which two radial recesses or slots 25, set 60° apart, extend inwardly. If four eccentrics 20 were employed, then said slots 25 would have to be spaced 90° apart.

Formed in the upper portion of the lower section of each link 24 is a semicircular recess 26, which forms with the semicircular portion of the upper section, a complete circle when the upper and lower sections of said link are bolted together. Projecting vertically from the upper section of the link 24, is an arm 27, which, in conjunction with the lower section of the link 24, forms a spacing guide between its respective eccentrics 20. (See Fig. 21.)

Referring to Figs. 6 and 15, there is provided in each eccentric disk 21, a pin 28 in alinement with the shaft 4. Beginning at the left in Fig. 15, the first pin 28 extends through the first eccentric disk 21, into the right-hand slot 25 of its adjacent link 24. The next pin 28 to the right, extends from the second eccentric disk 21, back into the left-hand slot 25 of the first link 24, and into the right-hand slot 25 of the second link 24. Then from the next eccentric disk 21 to the right, a pin 28 extends into the left-hand slot 25 of the second link 24. This arrangement of pins and links is carried out throughout the entire length and number of the eccentric disks 21. The last pin 28, however, extends through the last right-hand disk 21, into a slot 29 provided in a collar 30 on the end of the sleeve 17. (See Figs. 15 and 17.) The sleeve 17, which turns in the bearing 16, is provided at its outer end with a set of ratchet teeth 31 adapted to engage similar teeth 32 on the inner end of a sleeve 33 which has been internally grooved to receive the fluted end 34 of the shaft 4. (See Figs. 18 and 19.) After the sleeve 33 has been applied to the fluted end of the shaft 4, the end plate 11 is slipped over the end of said shaft, and said sleeve, onto the sleeve 17.

Referring to Fig. 17, there is provided in the sleeve 17 two slots 35 diametrically opposite each other, to receive two Woodruff keys 36 which are straddled by slotted bosses 37 that are diametrically arranged on the end of a sleeve 38, whereby the latter and the sleeve 17 are coupled firmly together. (See Figs. 17 and 20.)

The sleeve 38, in its outer end, contains a core 39 having a spiral bore adapted to receive the spiral end of a rod 40. The latter extends into a longitudinal bore provided in the outer end of the shaft 4, said rod 40 having a forward portion of reduced diameter through a longitudinal slot 41 in which there loosely projects a pin 42, preferably flat and at right angles to the shaft 4 through which it also passes. (See Figs. 7 and 15.)

Surrounding the rear end of the core 39 is a coil spring 43. This spring 43, bearing against the rear end of the sleeve 38, exerts sufficient pressure against the sleeve 33 to normally force the latter far enough on the fluted end of the shaft 4, to cause the ratchet end of the sleeve 33 to engage the ratchet end of the sleeve 17. Accordingly, through the mechanism just described, the eccentric disks 21 are all connected for rotation by the sleeve 38 that is in turn connected to the rod 40 whose function will be later described.

Surrounding the sleeve 38 is a sleeve 44 that is provided with four peripheral slots 45 which are formed to receive the pins 46 that project from the upper boss 14 of the end plate 11. (See Figs. 7 and 23.) This sleeve 44 also has two camming slots 47 which are provided in its outer rim, and a reduced inner end 48, for a purpose to be hereinafter described.

Referring to Figs. 15 and 25, a two part ring 49 is slidingly mounted on the sleeve 38. One half of the ring 49 is slipped over the sleeve 38, against the reduced end 48 of the sleeve 44, after which pins 50 are passed through elongated slots 51 in the sleeve 38, down into a groove 52 formed in the periphery of the sleeve 33. The remaining half of the ring 49 is moved over the sleeve 38, to firmly engage the pins 50 and force them tightly against the other half of the ring, each half having a corresponding recess to receive each pin, after which screws 53 are passed through the outer half of the ring 49, into the threaded portion of the inner half of said ring, to firmly compress said sections against the pins 50.

Referring to Fig. 7, the outer end of the rod 40 is formed to enter a bearing 54 which is supported by the outer reduced end of a slidable housing 55. This end of said housing is externally threaded to receive an internally threaded cap 56 which presses against the bearing 54 to hold it in place. A nut 57 is threaded on the outer end of the rod 40 to engage a spacing washer 58 which also assists in holding the bearing 54 in place. The housing 55 has an enlarged inner end to the top portion of which is cast a sleeve 59 that is bored to loosely receive a pin 60. (See Figs. 3, 4 and 7.) Referring to Figs. 4 and 15, there is cast on each side of the housing 55, a boss 61 that has been drilled to receive a pin 62 later to be described. The rear end of the pin 60 is screwed into a boss 63 provided on the top of a forked collar 64. (See Figs. 5 and 22.) The internal circumference of this collar is such that it may be slipped onto a hub 65 projecting outwardly from the end plate 11, and is held in place on said hub by springs 64ª having curved ends which enter slots 64ᵇ in the outer periphery of said collar 64 and whose rear ends are secured to the end plate 11. (See Fig. 15.)

Referring to Figs. 22 and 27, there is provided on the inner periphery of the collar 64 two oppositely disposed pins 66 which rest in the cam slots 47 of the sleeve 44 for a purpose to be hereinafter described. The collar 64 also has two downwardly and outwardly extending arms 67 and 68, the arm 67 terminating in a boss 69 bored to receive a pin 70 which connects said arm with a link 71 and which in turn is connected, through a pin 72, to the lower end of an operating lever 73. The lower central portion of said lever is circular to straddle the housing 55, as shown in Figs. 3 and 4. The circular portion of said lever 73 is provided in its outer periphery with two bosses 74 bored to loosely receive the pins 62 that are held in place by cotter pins 75. (See Figs. 3 and 15.)

Referring to Figs. 3 and 4, there is secured to the middle top portion of the lever 73 on each side thereof, an elongated flat spring 76 that terminates at its lower end in a free wing portion 77 which operates in conjunction with a pin 78 that is screwed into a boss 79 on the guiding member 18, for a purpose to be hereinafter described.

The connecting arms 23 communicate motive power from the shaft 4 to the shaft 2 as follows. Referring to Figs. 5 and 6, there is secured to the shaft 2, by means of a key 80, a sleeve 81 on which are loosely mounted a series of collars 82, each of which has a boss 83 projecting from its periphery, to loosely receive a pin 84 which extends through the lower reduced end of its connecting arm 23. (See Figs. 5, 6, 26 and 27.) Each collar 82 is milled away on each side of the boss 83, to loosely receive the end of its respective connecting arm 23.

Referring to Figs. 6, 26 and 27, there is provided on the side of each collar 82 opposite the boss 83, two bosses 85 and 86, on each side of which the periphery of the collar is also milled away to receive a shoe 87 adapted to be forced tightly against the periphery of the sleeve 81 by mechanism to be hereinafter described.

Each shoe 87 is held against the periphery of the sleeve 81 by a roller 88 mounted on a pin 89 secured to the boss 85 on the collar 82, and is operated in connection with a spring 90 one end of which is attached to a pin 91 secured to the boss 86 and the other end of which is attached to a pin 92 that oscillates in a hole provided in the lower end of the shoe 87. (See Fig. 6.) Projecting from the upper end of the shoe 87 is a horn 93 which is adapted to be engaged by the radial arms 94 and 95 on a reversing rod 96 whose ends are journaled in bosses 97 and 98 on the housing 3 and end plate 11 respectively. (See Fig. 3.) Between each collar 82 and its adjacent one to the right is a washer 99 to properly space said collars apart and hold the pins 84, 89 and 91 in position.

The reversing mechanism will now be described. Referring to Figs. 3, 4 and 6, the reversing rod 96 extends through the boss 98 on the end plate 11, a sufficient distance to fixedly receive a cam 100 provided with oppositely disposed lugs 101 which respectively receive springs 102 that are also connected to fixed lugs 103 on the end plate 11. The cam 100 has a nose portion 104 adapted to be engaged by the arm 68 on the collar 64, for a purpose later to be described.

The operation of the transmission mechanism will now be described. Referring to Figs. 5 and 6, which show the transmission in a neutral position, the shaft 4, eccentrics 20 and eccentric disks 21 are adapted under such a condition to be rotated by the engine without communicating any motion to the connecting arms 23, for the reason that each eccentric disk 21 is then so positioned on its respective eccentric 20, that both revolve as one circular disk within the circular portion of their respective connecting arm 23. Accordingly, no motion is communicated to said arms.

Now, in order to transmit power from the drive shaft 4 to the transmission shaft 2, the lever 73 is moved backward as indicated in Fig. 7. Since the straddling circular portion of the lever 73 is pivotally connected by the pins 62 to the slidable housing 55, and its lower end is connected to the arm 67 through the pins 72, link 71 and pin 70, when said lever is moved backward it will slide the housing 55 rearwardly along the guide pin 60. The rearwardly moving housing 55 will in turn draw rearwardly the rod 40 journaled therein, the latter being guided in its rearward movement by the pin 42 that loosely passes through the longitudinal slot 41 in said rod.

During the rearward movement of the rod 40, its spiral portion will rotate the sleeve 38, since it extends into the threaded core 39 of the latter. The sleeve 38, being connected by the keys 36 to the sleeve 17 as before described, will in turn rotate the latter. (See Figs. 15, 16 and 20.) The sleeve 17, however, will now turn independently of the sleeve 33, since when it is rotated at a faster rate than the latter sleeve, its teeth 31 will ride over the ends of the teeth 32. On the other hand, the sleeve 17 will turn the eccentric disks 21 around their respective eccentrics 20, since it is connected to the end disk 21 through the end pin 28, and by the remaining pins said disks are connected together for rotation in unison, as before described. Accordingly, when the lever 73 is moved rearwardly, the eccentric disks 21 will be turned thereby, through the means described, around their respective eccentrics 20, a distance corresponding to the distance the lever has been moved rearwardly. In other words, the disks 21 will be set by the lever 73, to rotate the shaft 2, through the means hereinbefore described, at a speed corresponding to that indicated by the position to which the lever 73 has been moved. When the lever 73 has been moved rearwardly a distance sufficient to rotate the rod 40 one half of a diameter, it will have turned the eccentric disks 21 around their eccentrics 20, through the means hereinbefore described, a distance representing speeds from zero to maximum. The zero or neutral position of a disk 21 on its respective eccentric 20, is shown in Fig. 6, while its maximum or full speed position is shown in Fig. 8.

The function of the spring 43 is to force the sleeve 33 forward on the fluted end 34 of the shaft 4, to maintain the teeth 32 of the sleeve 33 in engagement with the teeth 31 of the sleeve 17, so that the latter may be rotated by said shaft, the teeth 32 riding over the teeth 31 when the lever 73 is moved rearwardly. The lever 73 is returned to its normal position by one of the springs 76 whose wing end 77 is compressed against the guiding pin 60 when said lever has been moved beyond that position.

The number of speeds which may be obtained by the device, is limited only by the number of teeth that it may be desired to provide on the sleeves 17 and 33, since each tooth represents a stop or a given ratio of speed.

The operation of going from a higher to a lower speed will now be described. When the lever 73 is moved to the right, it pivots in the bearing 54 in the outer end of the housing 55, and also on the hub 65 through its connection through the pin 60 and link 71, with the collar 64 that oscillates on said hub. Therefore, during said movement of the lever 73, the pins 66 in the collar 74 engage the cam slots 47 in the sleeve 44, which slide said sleeve rearwardly and with it, the ring 49. The rearward movement of the latter is communicated, through the pins 50, to the sleeve 33, for which purpose said pins pass into a groove 52 in said sleeve, through the longitudinal slots 57 in the sleeve 38. (See Figs. 17, 18, 19 and 20.) The teeth 32 of the sleeve 33 will thereby be withdrawn from the teeth 31 of the sleeve 17, at which time the lever 73 can be moved from a higher to a lower speed.

Power is transmitted from the shaft 4 to the shaft 2 as follows, when a desired speed has been selected. As before described, each eccentric disk 21, of which there are preferably six set 60° apart, is surrounded by the annular portion of a connecting arm 23. Any movement communicated to the latter by its respective eccentric disk 21, will be imparted, through the pin 84, to its respective collar 82 on the sleeve 81 fast on the shaft 2. In other words, an oscillatory movement will be imparted to the collars 82 by the connecting arms 23, except when the eccentric disks are in their neutral position on their respective eccentrics 20.

During the forward driving movement of the transmission, the shoe 87 will have the position shown in Fig. 6. The outer periphery of this shoe has been cut from a point off center in each direction, as illustrated by the arms A and B in Fig. 24, to provide an increasing distance between its inner and outer periphery in each direction from the center line C C shown in said figure. The center line C C is shown in Fig. 24.

At one end, the shoe 87 is provided with a recess to receive the pin 92 which in turn has been milled away to receive the heart-shaped spring 90 attached at its central portion to the pin 91 that passes through the boss 86. When the shoe 87 is in the position shown in Figs. 6, 9, 10, 11, 12 and 13, the pointed end of the spring 90, being below a line drawn from the center of the pin 91 to the center of the shaft 2, will press the shoe downwardly between the roller 88 and the sleeve 81. Now, when the arm 23 starts to impart movement to the collar 82, the roller 88 will be carried by the boss 85 upon the upper wedge end of the shoe 87, until the latter bears so tightly upon the sleeve 81 that any further movement of the collar will impart a corresponding movement to said sleeve, and through it to the shaft 2. The amount of force so communicated to the shaft 2, will, of course, depend upon the length of the stroke of the connecting arm 23 as determined by its respective eccentric disk 21, said disk, as before described, being so positioned on its respective eccentric 20, as to communicate to the arm 23 a stroke which will rotate the shaft 2 at the speed desired. When one arm 23 has passed its maximum and starts to recede, the next arm is so arranged that it will start its power transmitting movement, and so on, with the result that the succession of power strokes of said arms impart an even, continuous movement to the shaft 2, in the same way that such a movement is imparted to a rolling barrel by the successive hand impulses of two or more men behind it.

The rotation of the shaft 2 is reversed as follows. Referring to Figs. 3, 4, 6, 14 and 15, the reverse rod 96, as has been stated, is provided with the radial arms 94 and 95. These arms are so arranged as to straddle the horn 93 of a respective shoe 87, all of said horns being in alinement and centrally located between their respective arms 94 and 95 when the transmission is in a neutral position. (See Figs. 5 and 6.) Now, when the lever 73 has passed the front end of the guiding pin 60, it is thrown to the left a sufficient distance to cause the arm 68 to move the nose portion of the cam 100 to a point where it will clear the outer end of said arm, at which time said nose portion 104 will be drawn by the spring 102 back to its normal position, or that shown in Fig. 4.

When the nose portion 104 of said cam 100 is being moved to the right by the arm 68, it turns the shaft 96, on which said cam is fast, to bring the lower arms 94 into engagement with the horns 93 of the shoes 87, to move the latter upward to a position where the oscillating pin 92 attached to the pointed end of the spring 90, has passed above a line drawn between the center of the pin 91 and the center of the shaft 2. (See Fig. 14.) At this time the roller 88 will act in the same manner upon the lower portion of the shoe 87 as it heretofore acted upon the upper portion of said shoe. In other words, the conditions heretofore described relating to the locking engagement between the shoe 87 and the sleeve 81, will be reversed; that is, the shoes 87 will lockingly engage the sleeve 81 on the upward movement of the arms 23, to rotate the shaft 2 in a reverse direction. The collars 82 will now be free to slide around the sleeve 81 on the downward movement of the arms 23, with the shoes 87 in locking engagement with said sleeve on the upward movement of said arms; while during the forward rotation of said shaft, the collars 82 slid around the sleeve 81 on the upward movement of said arms, the shoes 87 being then in locking engagement with said sleeve on their downward movement.

In the reverse position of the transmission, the lever 73 has assumed a position on the left-hand side of the guiding pin 60. Now, to again obtain a forward speed, it is only necessary to position the lever 73 on the right-hand side of the guiding pin 60. The operation of obtaining the various speeds in reverse, is just the same as that described for obtaining the various forward speeds, for as many speeds in reverse may be obtained as there are forward speeds.

The transmission just described is economical, durable and absolutely noiseless. It is much easier to operate than the ordinary transmissions, and can be changed to any speed regardless of the speed at which the engine is turning or the car is traveling.

There are no gears to grind or rattle, and it is constructed on "safety first" principles, in that it will always be locked against movement in a direction reverse from that in which it is set to travel. In the event the engine stalls on a hill or in any other dangerous place, it is impossible for the car to run backward, until it has been reversed by the driver. In such an emergency, it is only necessary to push the lever 73 forward to its neutral position, at which time the eccentric disks 21 will simply revolve within the annular portions of the connecting arms 23 without communicating any motion to the connecting arms 23, and the shoes 87 will have locked the shaft 2 from turning in a reverse direction. Therefore, it will be seen that it is unnecessary to set a brake to hold the car.

In the event the engine has stalled, as above described, it is only necessary, when it has started again, to move the lever 73 backward to a point where a low ratio of speed will be attained, at which time the car will start off easy and in the same manner at when a clutch has been allowed to slip.

This is accomplished, however, without the necessity of throwing out the clutch or having to release an emergency or foot brake.

The transmission is especially adapted for use in tractors and tanks from the fact that almost any speed can be obtained within one operation and without the use of the usual endless chains, gears and cogs. Its operation is absolutely positive, and there is no slipping such as has been experienced in various disk and friction types. The transmission can be operated by almost any child, as it would be impossible to make any mistake which would either strip a gear or twist off a shaft or axle.

I do not wish to be limited to the details of construction and arrangement herein shown and described, and any changes or modifications may be made therein within the scope of the subjoined claims.

Having described my invention, I claim:

1. In a device of the class described, the combination with a drive shaft, of a transmission shaft, adjustable eccentric means on the drive shaft, a series of collars loosely mounted on the transmission shaft, an arm connecting each collar with the adjustable eccentric means, for the purpose of reciprocating said collar when the drive shaft is rotated, a slidable shoe tapering outwardly toward each end, and a member carried by said collar adapted to engage either end of said shoe, to press the latter into locking engagement with the transmission shaft on a forward or reverse movement of said collar.

2. In a device of the class described, the combination with a drive shaft, of a transmission shaft, adjustable eccentric means on the drive shaft, a series of collars loosely mounted on the transmission shaft, an arm connecting each collar with the adjustable eccentric means, for the purpose of reciprocating said collar when the drive shaft is rotated, a slidable shoe tapering outwardly toward each end, a member carried by said collar adapted to slidingly engage either end of said shoe, to press the latter into locking engagement with said transmission shaft on the forward or reverse stroke of said connecting arm, and means for adjusting said shoe with relation to the engaging member to permit the latter to tightly engage said shoe on the forward or reverse stroke of said connecting arm.

3. In a device of the class described, the combination with a drive shaft, of a transmission shaft, adjustable eccentric means on the drive shaft, a series of collars loosely mounted on the transmission shaft, an arm connecting each collar with the adjustable eccentric means, for the purpose of reciprocating said collar when the drive shaft is rotated, a slidable shoe tapering outwardly toward each end, a member carried by said collar adapted to slidingly engage either end of said shoe, to press the latter into locking engagement with said transmission shaft on the forward or reverse stroke of said connecting arm, and a spring, one end of which is pivotally secured to one end of said shoe and the other end of which is secured to said collar, to maintain it in a position whereby the engaging member on said collar may press one end, or the other, of said shoe into locking engagement with the transmission shaft during the forward or reverse movement of said connecting arm.

4. In a device of the class described, the combination with a drive shaft, of a transmission shaft, adjustable eccentric means on the drive shaft, a series of collars loosely mounted on the transmission shaft, an arm connecting each collar with the adjustable eccentric means, for the purpose of reciprocating said collar when the drive shaft is rotated, a slidable shoe tapering outwardly toward each end, a member carried by said collar adapted to slidingly engage either end of said shoe, to press the latter into locking engagement with said transmission shaft on the forward or reverse stroke of said connecting arm, a projection on one end of said shoe, means for engaging said projection to move said shoe around the transmission shaft, to occupy such a position with reference to the engaging member on said collar, that said engaging member will press tightly against that end of said shoe which will impart a forward or reverse movement to the transmission shaft, on the forward or reverse movement respectively of the connecting arm.

5. In a device of the class described, the combination with a drive shaft, of a transmission shaft, a series of eccentrics fast on the drive shaft, an eccentric disk carried by each eccentric, means connecting the eccentric disks to the transmission shaft to rotate the latter, means connecting said eccentric disks together whereby they may be turned in unison about their respective eccentrics, a rotatable sleeve connecting to the innermost eccentric disk, surrounding the drive shaft, a rotatable member connected to the first sleeve, and a longitudinally movable spiral member entering said rotatable member, to rotate the latter, and through it, the first sleeve and the eccentric disks, to position them on their respective eccentrics whereby they may rotate the transmission shaft at a desired rate of speed irrespective of the speed of rotation of the drive shaft.

6. In a device of the class described, the combination with a drive shaft, of a transmission shaft, a series of eccentrics fast on the drive shaft, an eccentric disk surrounding each eccentric, means connecting said eccentric disks to the transmission shaft to rotate the latter, means connecting said eccentric disks together whereby they may be turned in unison about their respective eccentrics, a rotatable sleeve connected to the innermost eccentric disk, surrounding the drive shaft, a second sleeve connected to the first sleeve, and having a spiral bore, and a rod longitudinally movable within the drive shaft, having a spiral portion extending from the outer end of the latter into the spiral bore in the second sleeve, to turn the latter when said rod is moved longitudinally, and through it to set the eccentric disks in a position on their respective eccentrics, to rotate the transmission shaft at a desired speed irrespective of the speed of rotation of the drive shaft.

7. In a device of the class described, the combination with a drive shaft, of a transmission shaft, a series of eccentrics fast on the drive shaft, an eccentric disk surrounding each eccentric, means for connecting said eccentric disks and transmission shaft whereby the former may rotate the latter, means connecting said eccentric disks for a group rotation about their respective eccentrics, a rotatable sleeve connected to the innermost eccentric disk, surrounding the drive shaft, a second sleeve connected to the first sleeve, a longitudinally movable rod having a spiral portion entering the second sleeve to rotate the latter when said rod is moved longitudinally, and hand-controlled means for imparting a longitudinal movement to said rod.

8. In a device of the class described, the combination with a drive shaft, of a transmission shaft, a series of eccentrics fast on the drive shaft, an eccentric disk surrounding each eccentric, means for connecting said eccentric disks and transmission shaft whereby the former may rotate the latter when the drive shaft is turned, means connecting said eccentric disks together for rotation in unison about their respective eccentrics, a rotatable sleeve connected to the innermost eccentric, surrounding the drive shaft, a second sleeve connected to the first sleeve, a spiral rod having a linear movement with respect to the drive shaft, entering the second sleeve to rotate the latter when said rod is moved longitudinally, a slidable housing adapted to receive, and impart a longitudinal movement to, said rod, and a lever adapted to longitudinally shift said housing a distance that will set the eccentric disks in a position on their respective eccentrics to rotate the transmission shaft at a desired rate of speed when the drive shaft is turned.

9. In a device of the class described, the combination with a drive shaft, of a transmission shaft, a series of eccentrics fast on the drive shaft, an eccentric disk surrounding each eccentric, means for connecting said eccentric disks and transmission shaft whereby the former may rotate the latter when the drive shaft is turned, a rotatable sleeve connected to the innermost eccentric disk, surrounding the drive shaft, a second sleeve connected to the first sleeve, a spiral rod having a linear movement with respect to the drive shaft, entering the second sleeve to rotate the latter when said rod is moved longitudinally, a slidable housing adapted to receive, and impart a longitudinal movement to, said rod, said housing surrounding the second sleeve, and a lever having a portion straddling said slidable housing and pivotally connected thereto, to shift it a distance that will set the eccentric disks in a position on their respective eccentrics to rotate the transmission shaft at a desired rate of speed when the drive shaft is turned.

10. In a device of the class described, the combination with a drive shaft, of a transmission shaft, a series of eccentrics fast on the drive shaft, an eccentric disk surrounding each eccentric, means for connecting said eccentric disks and transmission shaft whereby the former may rotate the latter when the drive shaft is turned, means connecting said eccentric disks together for rotation in unison about their respective eccentrics, a rotatable sleeve connected to the innermost eccentric, surrounding said drive shaft, and means connecting said sleeve to the drive shaft for rotation thereby.

11. In a device of the class described, the combination with a drive shaft, of a transmission shaft, a series of eccentrics fast on the drive shaft, an eccentric disk surrounding each eccentric, means for connecting said eccentric disks and transmission shaft whereby the latter may be rotated by the former when the drive shaft is turned, means connecting said eccentric disks together for rotation in unison about their respective eccentrics, a rotatable sleeve connected to the innermost eccentric, surrounding said drive shaft, a second sleeve longitudinally movable on said drive shaft and adapted to be rotated by the latter, adjacent ratchet teeth on said sleeves, resilient means for holding the ratchet teeth on the second sleeve in normal engagement with the ratchet teeth on the first sleeve, whereby the latter may be rotated by the former when the drive shaft is turned, and means for turning the first sleeve in a forward direction irrespective of the movement of the second sleeve, to set the eccentric disks in a position on their respective eccentrics to rotate the transmission shaft at a desired rate of speed when said first sleeve is again rotated by the second sleeve.

12. In a device of the class described, the combination with a drive shaft, of a transmission shaft, a series of eccentrics fast on the drive shaft, an eccentric disk surrounding each eccentric, means for connecting said eccentric disks and transmission shaft whereby the latter may be rotated by the former when the drive shaft is turned, means connecting said eccentric disks together for rotation in unison about their respective eccentrics, a rotatable sleeve connected to the innermost eccentric, surrounding said shaft, a second sleeve longitudinally movable on a fluted portion of said drive shaft and adapted to be rotated by the latter, ratchet teeth formed on the outer end of the first sleeve, ratchet teeth on the inner end of said second sleeve, resilient means for holding the ratchet teeth on the second sleeve in normal engagement with the ratchet teeth on the first sleeve, a third sleeve surrounding the first and second sleeves, and connected to the first sleeve, and longitudinally-movable hand-controlled means for rotating the third sleeve, to turn the first sleeve in a forward direction irrespective of the rate of movement of the second sleeve, to set the eccentric disks in a position on their respective eccentrics to rotate the transmission shaft at a desired rate of speed when said first sleeve is again rotated by the second sleeve.

13. In a device of the class described, the combination with a drive shaft, of a transmission shaft, a series of eccentrics fast on the drive shaft, an eccentric disk surrounding each eccentric, means for connecting said eccentric disks and transmission shaft whereby the latter may be rotated by the former when the drive shaft is turned, means connecting said eccentric disks together for rotation in unison about their respective eccentrics, a rotatable sleeve connected to the innermost eccentric, surrounding said drive shaft, a second sleeve longitudinally movable on the drive shaft and adapted to be rotated by the latter, ratchet teeth formed on the outer end of the first sleeve, ratchet teeth formed on the inner end of the second sleeve, resilient means for normally holding the ratchet teeth on the second sleeve in engagement with the ratchet teeth on the first sleeve, longitudinally-adjustable means for rotating the first sleeve at a faster rate of speed than the second sleeve, under which condition the ratchet teeth on the former ride over the ratchet teeth on the latter, and means operated by the longitudinally-adjustable means to withdraw the second sleeve from engagement with the first sleeve, when the direction of movement of said longitudinally-adjustable means is reversed.

14. In a device of the class described, the combination with a drive shaft, of a transmission shaft, a series of eccentrics fast on the drive shaft, an eccentric disk surrounding each eccentric, means for connecting said eccentric disks and transmission shaft whereby the latter may be rotated by the former when the drive shaft is turned, means connecting said eccentric disks together for rotation in unison about their respective eccentrics, a rotatable sleeve connected to the innermost eccentric, surrounding said drive shaft, a second sleeve longitudinally movable on said drive shaft and adapted to be rotated by the latter, oppositely-disposed ratchet teeth on said sleeves, resilient means for holding the ratchet teeth on the second sleeve in normal engagement with the ratchet teeth on the first sleeve, whereby the latter may be rotated by the former when the drive shaft is turned, a third sleeve surrounding the first and second sleeves, and connected to the first sleeve, a longitudinally adjustable device adapted, when moved in one direction, to turn said first sleeve in a forward direction ahead of the second sleeve to set the eccentric disks in a position on their respective eccentrics to rotate the transmission shaft at a desired rate of speed when the first sleeve is rotated by the second, and means operatively connected to the longitudinally adjustable means, extensible through longitudinal slots provided in the third sleeve, into engagement with the second sleeve, to withdraw the latter from engagement with the first sleeve, to permit the longitudinally-adjustable means to be moved in a reverse direction.

15. In a device of the class described, the combination with a drive shaft, of a transmission shaft, a series of eccentrics fast on the drive shaft, an eccentric disk surrounding each eccentric, means for connecting said eccentric disks and transmission shaft whereby the latter may be rotated by the former when the drive shaft is turned, means connecting said eccentric disks together for rotation in unison about their respective eccentrics, a rotatable sleeve connected to the innermost eccentric, surrounding said drive shaft, a second sleeve longitudinally movable on said drive shaft and adapted to be rotated by the latter, oppositely-disposed ratchet teeth on said sleeves, resilient means for holding the ratchet teeth on the second sleeve in normal engagement with the ratchet teeth on the first sleeve, whereby the latter may be rotated by the former when the drive shaft is turned, a third sleeve surrounding the first and second sleeves, and connected to the first sleeve, a spiral rod having a linear movement with respect to the drive shaft, entering the third sleeve, a slidable housing adapted to receive the outer end of said rod, to impart a longitudinal movement thereto, a lever having a lower middle portion straddling, and pivotally connected to, said housing, to shift the latter a distance to set the eccentric disks on their respective eccentrics for a desired speed of the transmission shaft, and means connected to the lower end of said lever, engaging the second sleeve through slots provided in the third sleeve, to withdraw the second sleeve from engagement with the first sleeve to permit said lever to be moved in a reverse direction for the purpose of turning the eccentric disks from a position for a higher, to a position for a lower, speed of the transmission shaft.

16. In a device of the class described the combination with a drive shaft, of a transmission shaft, adjustable eccentric means on the drive shaft, a series of collars loosely mounted on the transmission shaft, an arm connecting each collar with the adjustable eccentric means, for the purpose of reciprocating said collar when the drive shaft is rotated, a slidable shoe tapering outwardly toward each end, a member carried by said collar adapted to slidingly engage either end of said shoe, to press the latter into locking engagement with said transmission shaft on the forward or reverse stroke of said connecting arm, a projection on one end of said shoe, a transverse shaft, a pair of radial arms on one end of said shaft, straddling the projection on said shoe, a cam on the other end of said shaft, an operating lever, and means in operative connection with said lever, adapted to engage said cam to rotate said transverse shaft in a direction whereby one of said radial arms will engage the projection on said shoe, to move the latter around the transmission shaft to such a position with reference to the engaging member on said collar, that said engaging member will press tightly against that end of said shoe which will impart a reverse movement to the transmission shaft on the reverse strokes of the connecting arms.

In testimony whereof I have hereunto set my hand this 28th day of June, 1918.

WILLIAM DUNN.

Witness:
HOWARD S. SMITH.